US009324054B2

(12) United States Patent
Amanieux

(10) Patent No.: US 9,324,054 B2
(45) Date of Patent: Apr. 26, 2016

(54) CROSS-PLATFORM DOCUMENT EXCHANGE USING MOBILE DEVICES

(75) Inventor: Antoine Amanieux, New York, NY (US)

(73) Assignee: Adobe Systems Incorporated, San Jose, CA (US)

(*) Notice: Subject to any disclaimer, the term of this patent is extended or adjusted under 35 U.S.C. 154(b) by 1125 days.

(21) Appl. No.: 12/333,177

(22) Filed: Dec. 11, 2008

(65) Prior Publication Data
US 2014/0250203 A1 Sep. 4, 2014

(51) Int. Cl.
G06F 15/16 (2006.01)
G06Q 10/10 (2012.01)
G06F 17/30 (2006.01)

(52) U.S. Cl.
CPC .......... *G06Q 10/10* (2013.01); *G06F 17/30047* (2013.01)

(58) Field of Classification Search
USPC ....................................... 270/52.02
See application file for complete search history.

(56) References Cited

U.S. PATENT DOCUMENTS

| 5,933,829 | A | 8/1999 | Durst et al. |
|---|---|---|---|
| 5,978,773 | A | 11/1999 | Hudetz et al. |
| 6,081,827 | A | 6/2000 | Reber et al. |
| 6,199,048 | B1 | 3/2001 | Hudetz et al. |
| 6,764,009 | B2 | 7/2004 | Melick et al. |
| 6,898,625 | B2 * | 5/2005 | Henry et al. ................. 709/206 |
| 7,070,103 | B2 | 7/2006 | Melick et al. |
| 7,118,040 | B2 | 10/2006 | Melick et al. |
| 7,150,400 | B2 | 12/2006 | Melick et al. |
| 7,267,279 | B2 | 9/2007 | Melick et al. |
| 7,337,948 | B2 | 3/2008 | Melick et al. |
| 7,337,971 | B2 | 3/2008 | Melick et al. |
| 7,350,708 | B2 | 4/2008 | Melick et al. |
| 2002/0070278 | A1 * | 6/2002 | Hung et al. ............... 235/472.01 |
| 2002/0131071 | A1 * | 9/2002 | Parry ........................... 358/1.15 |
| 2002/0196478 | A1 * | 12/2002 | Struble ........................... 358/474 |
| 2006/0029296 | A1 * | 2/2006 | King et al. ..................... 382/313 |
| 2007/0145138 | A1 | 6/2007 | Snyder et al. |
| 2007/0246538 | A1 | 10/2007 | Melick et al. |
| 2008/0017714 | A1 | 1/2008 | Melick et al. |
| 2008/0017722 | A1 | 1/2008 | Snyder et al. |
| 2008/0068344 | A1 * | 3/2008 | Kim ...................... G06F 3/0481 345/173 |
| 2008/0078836 | A1 * | 4/2008 | Tomita ..................... 235/462.11 |
| 2008/0156879 | A1 | 7/2008 | Melick et al. |
| 2009/0037575 | A1 * | 2/2009 | Crystal .................. G06Q 30/02 709/224 |
| 2009/0285492 | A1 * | 11/2009 | Ramanujapuram et al. .. 382/209 |
| 2010/0081375 | A1 * | 4/2010 | Rosenblatt ............. G08C 17/02 455/41.1 |
| 2010/0082491 | A1 * | 4/2010 | Rosenblatt ............. G06Q 10/02 705/65 |
| 2010/0082784 | A1 * | 4/2010 | Rosenblatt .......... H04L 12/2812 709/222 |
| 2010/0177970 | A1 * | 7/2010 | King et al. .................... 382/229 |

FOREIGN PATENT DOCUMENTS

WO WO 2006/065250 A1 6/2006

* cited by examiner

*Primary Examiner* — Kostas Katsikis

(74) *Attorney, Agent, or Firm* — Kilpatrick Townsend & Stockton LLP

(57) ABSTRACT

Document exchange is disclosed between a computer and a portable device equipped with camera functionality, memory storage, network interface, and appropriate software. An image of a computer screen is captured by the portable device. The computer screen is displaying a document intended for exchanging. The portable device examines the image to identify marking indicia that provides location information about the document. When such marking indicia is found, it is translated and used to transmit a request for a copy to the computer where the document is stored. On receipt of the request, the computer transmits the copy to the portable device.

31 Claims, 7 Drawing Sheets

CROSS-PLATFORM DOCUMENT EXCHANGE USING MOBILE DEVICES

TECHNICAL FIELD

This disclosure relates, in general, to electronic document management, and, more particularly, to cross-platform document exchange using mobile devices.

BACKGROUND

Document exchange is an integral part of modern computing. In fact, some of the earliest incarnations of the Internet were built to exchange scholarly work between scientists and researchers. Users may typically view and work with documents on different computers and devices. For example, a user may work on a document on a home computer and then continue working on the document on his or her office computer. Another scenario may involve one user working on a document in his or her office and sending that document for review by other users on different computers. With the advancements made in networking availability, the most efficient way, in general, to accomplish these tasks has been to electronically transfer the document, as opposed to transferring the hardware, on which the document resides, from one computer or device to another or saving the document to disk and then transferring the disk to the other computer.

Because everyone does not operate the same type of computer, electronically transferred documents may be viewed on various different computing platforms. For instance, in the example above, the user working on the document at home maybe using a computer running a MACINTOSH® platform, available from Apple Inc., while the user's computer in his or her office maybe running a WINDOWS® platform available from Microsoft Corporation. Perhaps even more common is the situation in which a user views and edits a document on a personal computer and then views the document on a personal digital assistant ("PDA"), cell phone, or other wireless device, such as Research in Motion Ltd.'s BLACKBERRY® device.

Exchanging documents quickly and efficiently is generally important to a successful business and is desirable even in non-business environments. There are several methods used to exchange documents today. Perhaps the most common is the near ubiquitous email system. A user who works at home may simply email the document to another user. The other user would then open the document on his or her computer using the appropriate program. Another common method of exchanging documents is to use a Universal Serial Bus (USB) flash storage drive, which is comparable to a modern day floppy disk. These devices plug into an USB port on a computer. When the USB storage drive is plugged into the computer, the user may save the document on the USB storage drive. The USB drive can then be removed and plugged into another computer. The document can then be downloaded from the USB storage drive onto the second computer.

There are also various document management systems (DMS) that allow uses to log in to a system either locally or remotely in order to access, edit, and save documents in the DMS system. For example, a large business may include a business-wide DMS system that workers log into when local to the working facility. When these workers are remote from the working facility, they may typically access the business-wide DMS system through a direct dial in, a virtual private network (VPN), internet or web access sites, and the like. When logged in remotely, these remote workers will have the same access to documents that are on the business-wide DMS system. Thus, the system documents may be exchanged with the remote computers that the workers use to access the DMS system.

Bar codes and other types of machine readable codes may also be used to create intelligent documents. Intelligent documents have bar codes or other machine readable codes imprinted on them. The machine readable codes are often encrypted to enhance security. When the codes are scanned or read, a location pointer reveals the location of the document or information about the document. Other information may also be included, such as the author and date of the document. All this information may be retrieved by scanning the machine readable code.

BRIEF SUMMARY

The present disclosure is directed to systems and methods by which documents may be exchanged between a computer and a portable device equipped with memory storage, network interface and appropriate software. In one embodiment, a PDA with a camera is used to take a picture of a document on a computer screen. The document has marking indicia on it that is used to retrieve a binary version or copy of the document. The binary version may then be "pasted" onto another computer or viewed on the PDA display.

Additional representative embodiments of the present teachings are directed to computer implemented methods that include capturing a first image on a portable device of a first computer display, wherein a document is shown on the first computer display, identifying, on the first image, marking indicia associated with location information related to the document, transmitting a request to a first computer coupled to the first computer display using the location information, the request requesting a copy of the document from the first computer, receiving the copy at the portable device from the first computer, and rendering the copy onto a portable display of the portable device.

Further representative embodiments of the present teachings are directed to mobile devices that include a processor coupled to storage memory and a lens under control of a camera application stored in the storage memory. When executed by the processor, the operating camera application is configured to capture image data through the lens. The mobile devices further include a transceiver under control of the processor and configured to transmit and receive data and a document exchange application stored in the storage memory. When executed by the processor, the operating document exchange application includes an identification module configured to examine a first image captured through the lens of a first computer screen displaying a document to be exchanged, wherein the first image is examined to identify marking indicia associated with the document, a translation module configured to translate the marking indicia, responsive to the marking indicia being detected, into location information associated with the document and the first computer coupled to the first computer screen, and a communication module configured to transmit a request to the first computer through the transceiver and using the location information, wherein the request requests a copy of the document associated with the location information, wherein the communication module is further configured to receive the copy from the first computer.

Still further representative embodiments of the present teachings are directed to specially programmed computers that include a processor coupled to storage memory, a network interface under control of the processor and configured to send and receive data from one or more networks, a computer identifier (ID) stored in the storage memory representing an identity and location of the specially programmed computer, and a document exchange application stored in the storage memory. When executed by the processor, the document exchange application includes a communication module configured to receive a request from a mobile device through the network interface and using location information contained within the request retrieving a copy of a document associated with the location information, wherein the communication module is further configured to send the copy to the mobile device.

Still further representative embodiments of the present teachings are directed to computer program products having computer readable medium with computer program logic recorded thereon. The computer program products include code for capturing a first image on a portable device of a first computer display, wherein a document is shown on the first computer display, code for identifying, on the first image, marking indicia associated with location information related to the document, code for transmitting a request to a first computer coupled to the first computer display using the location information, the request requesting a copy of the document from the first computer, code for receiving the copy at the portable device from the first computer, and code for transforming a state of ones of a plurality of pixels of a portable display of the portable device to render the copy onto the portable display.

Additional representative embodiments of the present teachings are directed to computer implemented methods that include executing instructions on a computing platform so that binary digital electronic signals capture a first image on a portable device of a first computer display, wherein a document is shown on the first computer display, executing instructions on the computing platform so that binary digital electronic signals identify, on the first image, marking indicia associated with location information related to the document, executing instructions on the computing platform so that binary digital electronic signals transmit a request to a first computer coupled to the first computer display using the location information, the request requesting a copy of the document from the first computer, executing instructions on the computing platform so that binary digital electronic signals receive the copy at the portable device from the first computer and executing instructions on the computing platform so that binary digital electronic signals render the copy onto a portable display of the portable device.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes described herein. It should also be realized by those skilled in the art that such equivalent constructions do not depart from the spirit and scope of the appended claims. The novel features which are believed to be characteristic of this disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of limits.

BRIEF DESCRIPTION OF THE DRAWINGS

For a more complete understanding of this disclosure, reference is now made to the following descriptions taken in conjunction with the accompanying drawing, in which.

DETAILED DESCRIPTION

Figure 1:
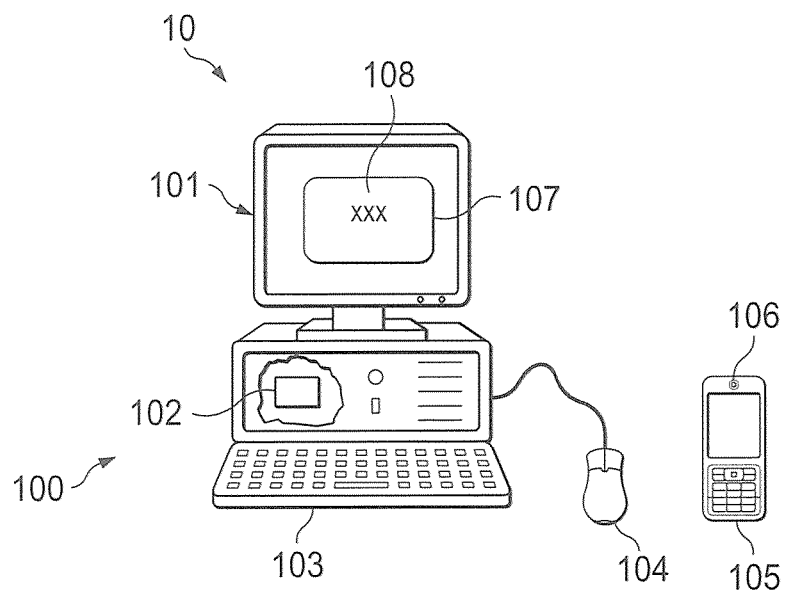
FIG. 1, a diagram is shown illustrating a document exchange system configured according to one embodiment of the present teachings.

Turning now to FIG. 1, a diagram is shown illustrating document exchange system 10 configured according to one embodiment of the present teachings. Document exchange system 10 includes computer system 100, comprising monitor 101, central processor unit 102, keyboard 103 and mouse interface 104, and mobile phone 105. Mobile phone 105 includes camera functionality with lens 106 along with a document exchange application stored in camera memory (not shown). A user of document exchange system 10 wishes to copy document 107 to mobile phone 105. Using the document exchange application, mobile phone 105 captures an image of monitor 101. Mobile phone 105 then examines the image data to identify any recognized marking indicia. When displayed on monitor 101, document 107 includes marking indicia 108. The examination of the image data reveals marking indicia 108, which mobile phone 105 then translates into information relating to computer system 100 and the location of document 107. Communication is then established between mobile phone 105 and computer system 100 in which mobile phone 105 uses the translated information to request a binary copy of document 107 from computer system 100. In response, computer system 100 retrieves the binary copy of document 107 and transmits it back to mobile phone 105. Using the binary copy, mobile phone 105 may display an image of document 107 on its display.

Figure 2:
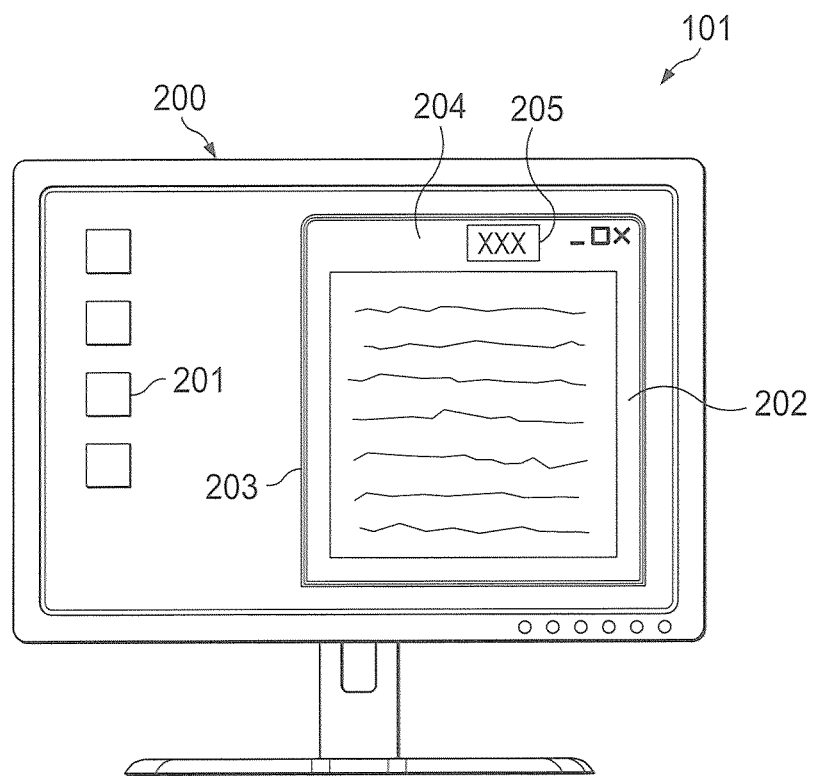
FIG. 2 is a diagram illustrating a monitor displaying a document having marking indicia configured according to one embodiment of the present teachings.

FIG. 2 is a diagram illustrating monitor 101 displaying document 202 having marking indicia 204 configured according to one embodiment of the present teachings. Desktop 200 rendered on monitor 101 displays desktop items 201 and document 202 within window pane 203. Desktop items 201 are icons, such as for "Recycle Bin", "My Documents" and "My Computer," which are found commonly on a desktop of the WINDOWS® operating system. For purposes of FIG. 2, document 202 is a MICROSOFT WORD® document, available from Microsoft Corporation. The MICROSOFT WORD® application displays document 202 within its own window container, window pane 203. The operating system displays marking indicia 204 onto the title bar of window pane 203. Marking indicia 204 is a visual indicator that represents information about document 202, such as its storage address or location and information about the address or location of computer system 10 (FIG. 1).

It should be noted that marking indicia 204 may comprise any number of different types of visual indicators, such as textual information, graphical information, a bar code, encoded text, or the like. The information that marking indicia 204 represents is the location information of document 202 and computer system 10 (FIG. 1). The location information may be an Internet Protocol (IP) address, Media Access Control (MAC) address, routing information or any other information or combinations of information related to the location of a binary version of the document. This location information can be combined and encoded into the visual indicators of marking indicia 204.

Figure 3:
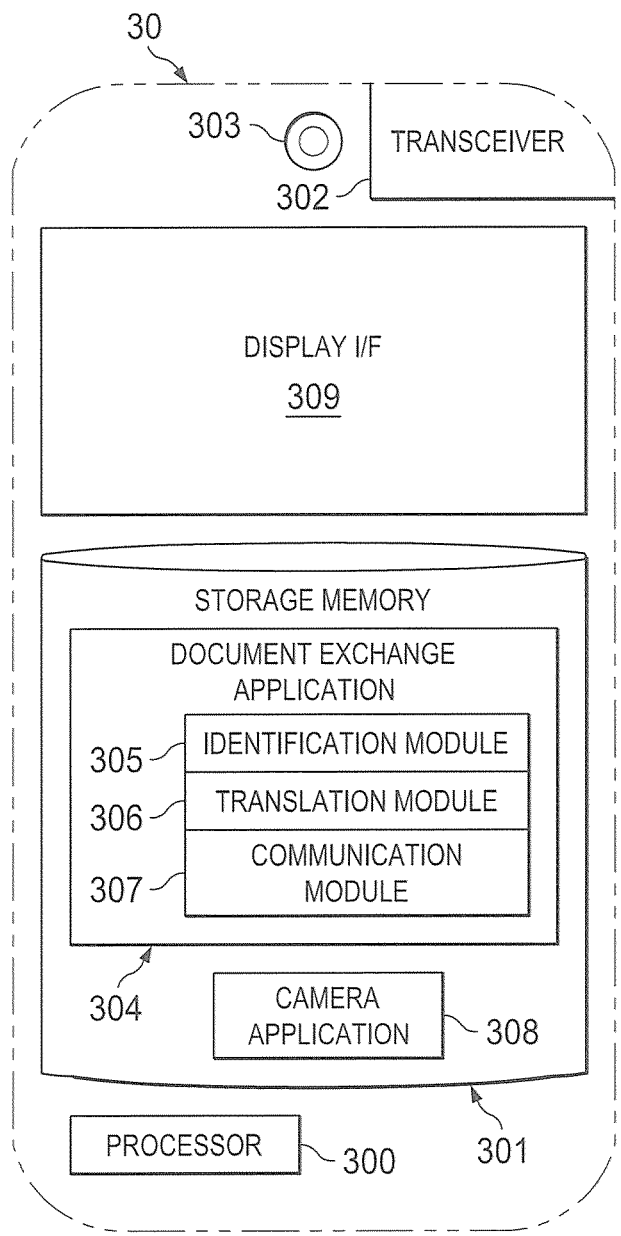
FIG. 3 is a block diagram illustrating a portable device configured according to one embodiment of the present teachings.

FIG. 3 is a block diagram illustrating portable device 30 configured according to one embodiment of the present teachings. Portable device 30 comprises processor 300, storage memory 301, transceiver 302, and display interface 309 for controlling a portable display (not shown). Portable device 300 also comprises lens apparatus 303 allowing it to capture image data for pictures and video. Processor 300 processes the instructions used to operate the device as well as any applications installed into portable device 30 and stored in storage memory 301, such as document exchange application 304 and camera application 308. Transceiver 302 provides the transmitter and receiver functionalities to portable device 30 in order to connect to various networks and other devices using appropriate wireless protocols.

Document exchange application 304 provides identification module 305, translation module 306, and communication module 307 to be stored in storage memory 301. When executed by processor 300, identification module 305 examines a document image captured through lens apparatus 303 under control of camera application 308 for any marking indicia visible within the document image. If such marking indicia are found, processor 300 executes translation module 306 to convert the information encoded in the marking indicia into location information that identifies a location of a binary version of the document represented by the document image and a location of the computer on which the document is being displayed. Processor 300 then executes communication module 307 which uses this location information to locate the host computer and retrieve a binary copy of the document represented by the captured document image at the memory location indicated in the marking indicia. By retrieving a binary copy of the document, portable device 30 is not required to include any specialized media players or media viewers. A binary copy of the document will typically exist in the display memory of the host computer displaying the document. The binary document format is generally universally displayable. This document retrieval occurs through wireless communication between portable device 30 and the host computer displaying the document in a peer-to-peer communication session through transceiver 302. When received at portable device 30, the binary copy of the document is rendered onto the portable display through rendering instructions issued by processor 300 and delivered through display interface 309. The rendering instructions control the states of the various pixels making up the portable display.

It should be noted that in additional and/or alternative embodiments of the present teachings, portable device 30 may retrieve a copy of the actual document instead of merely a binary copy of the document. In such embodiments, portable device 30 would have the appropriate media viewer or media player on which to run and view the retrieved document.

Figure 4:
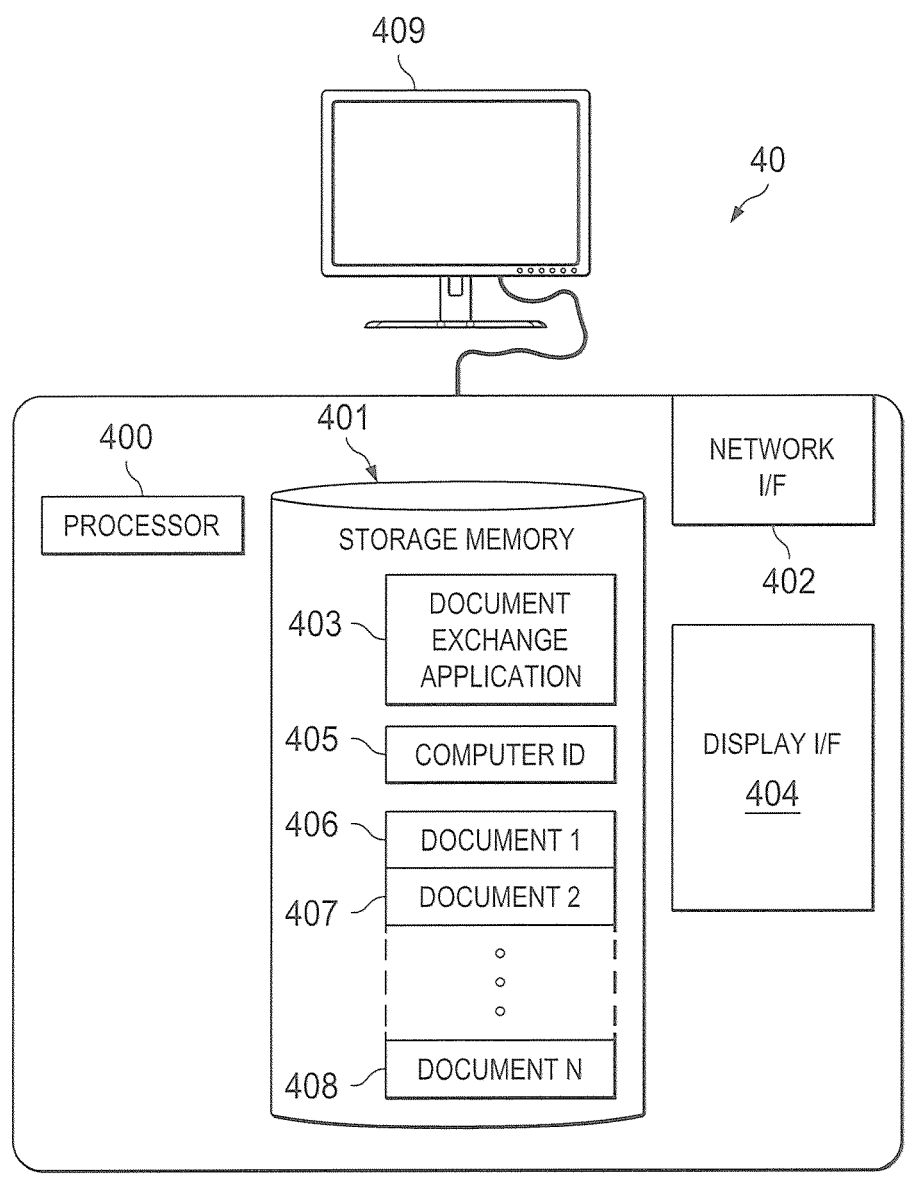
FIG. 4 is a block diagram illustrating a specially programmed computer configured according to one embodiment of the present teachings.

FIG. 4 is a block diagram illustrating specially programmed computer 40 configured according to one embodiment of the present teachings. specially programmed computer 40 includes processor 400, storage memory 401, network interface 402, and display interface 404. Processor 400 executes instructions related to various computing tasks performed by specially programmed computer 40. Storage memory 401 stores data and applications, such as document exchange application 403, which includes a communication module, computer ID 405 and documents 406-408, that will be used on specially programmed computer 40. Specially programmed computer 40 becomes a specially programmed computer when processor 400 executes the program code defining document exchange application 403. Computer ID 405 identifies specially programmed computer 40 to other computers or devices connected to the network including specially programmed computer 40's location. Such identification may be in the form or an IP address, MAC address, or the like. Documents 406-408 are binary versions of various documents displayed onto display 409. Display interface 404 processes display instructions in order to render visual information related to any data, such as the binary data of documents 406-408, onto display 409. Network interface 402 provides an access point between specially programmed computer 40 and various external networks, either wirelessly or via landline.

In operation, specially programmed computer 40 displays a document on display 409 that is representative of the binary information of document 406. A mobile device, such as portable device 30 (FIG. 3) equipped with a document exchange application takes a picture of the document on display 409. After examining the document image and finding marking indicia, the marking indicia is translated to reveal location information identifying specially programmed computer 40, such as computer ID 405, and the location address of document 406 within storage memory 401. Using an available wireless protocol, the mobile device establishes a peer-to-peer communication link with specially programmed computer 40. The mobile device may use computer ID 405 in order to establish this connection link. Once the mobile device and computer 40 are in communication, mobile device requests a copy of document 406 by giving computer 40 the location address of document 406. Specially programmed computer 40 copies document 406 and transmits it to the mobile device over the wireless connection. The mobile device may now view or further transmit the copy of document 406.

Computer 40, as depicted in FIG. 4, may also be used in a "paste" process, to receive a copy of a binary document that has been "copied" by a mobile device. In furtherance of the process explained above, the mobile device also has a copy of a binary document stored in its local memory. This binary document was retrieved or copied in a similar manner as described above, from another computer. The mobile device takes a picture of the screen of computer 40 again. A identification module examines the image data of this picture again for marking indicia. In the example above, a document represented by document 406 is displayed on display 409 through rendering instructions delivered by display interface 404 under control of processor 400. The communication module within document exchange application 403 takes computer ID 405 and the location address of document 406 and generates the marking indicia that will be displayed through display interface 404 onto display 409. Thus, marking indicia is present and detected by the mobile device. The marking indicia is then translated into the location information which represents a combination of the location information of computer 40, i.e., computer ID 405, and the storage location address of document 406. To implement the paste process, the mobile device uses only the portion of the location information representing computer ID 405 to identify the location of the target computer for the paste, i.e., computer 40. Using this part of the location information, the mobile device initiates a communication link with computer 40. Once the link is established, the mobile device transmits the copy of the binary document copied from the other computer to computer 40. Computer 40 stores this document in storage memory 401, for example as document 408. Thus, a document has been copied by the mobile device from one computer, and then copied onto computer 40 using the camera functionality of the mobile device and a peer-to-peer connection between the mobile device and computer 40.

Figure 5:
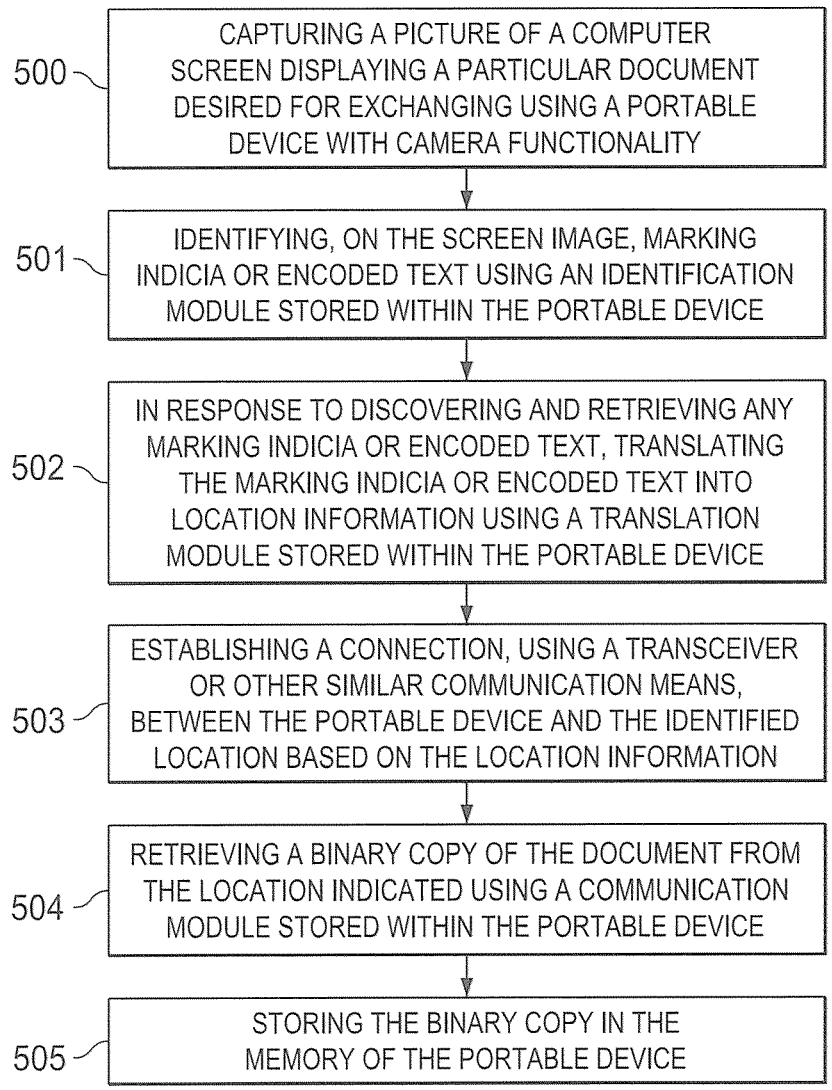
FIG. 5 is a flowchart illustrating example steps used to implement one embodiment of the present teachings.

FIG. 5 is a flowchart illustrating example steps used to implement one embodiment of the present teachings. In process block 500, a portable device uses camera functionality to take a picture of a computer screen displaying a particular document desired for exchanging. In process block 501, the portable device examines the screen image for marking indicia or encoded text using a identification module stored within the portable device. In response to discovering and retrieving any marking indicia or encoded text, the portable device translates the marking indicia or encoded text into location information, in process block 502, using a translation module stored within the portable device. The translated location information relates to the document. Based on the location information, a connection is established between the portable device and the identified location in process block 503. The connection may be made using a transceiver of the portable device or by some other communication means. In process block 504, the portable device uses a communication module to retrieve a binary copy of the document from the location indicated. The binary copy is then stored in the memory of the portable device in process block 505.

The process blocks of FIG. 5 describe the "copy" functionality of selected embodiments of the present teachings. This copy functionality may be used as the only process implemented in various embodiments of the present teachings. In additional and/or alternative embodiments of the present teachings, the copy functionality may provide half of the total functionality, with a complementary "paste" feature being used for the other half of the total functionality.

Figure 6:
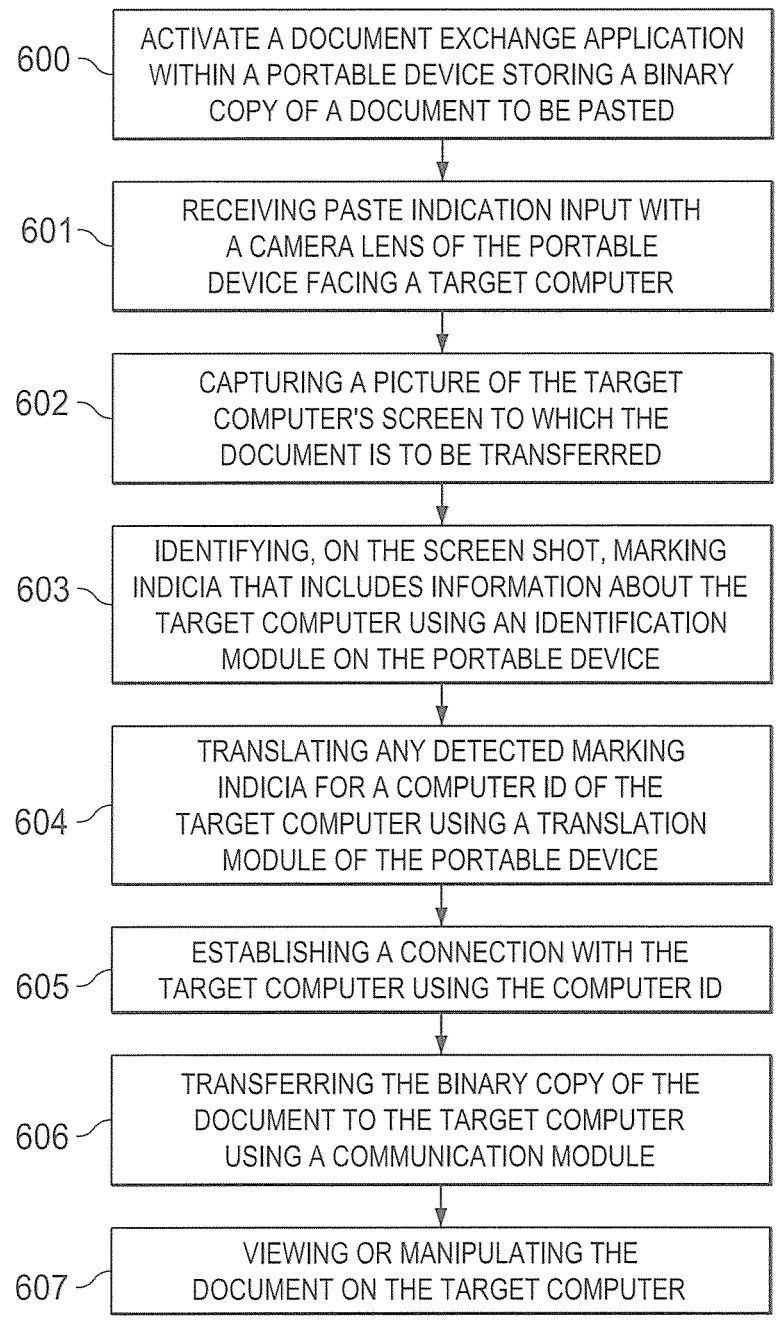
FIG. 6 is a flowchart illustrating example steps used to implement one embodiment of the present teachings.

FIG. 6 is a flowchart illustrating example steps used to implement one embodiment of the present teachings. In process block 600, a document exchange application is activated within a portable device storing a binary copy of a document to be pasted. Paste indication input is received in process block 601, with a camera module of the portable device facing a target computer. In process block 602, the portable device captures a picture of the target computer's screen to which the document is to be transferred. This screen shot is examined, in process block 603, using a identification module of the portable device, for marking indicia that includes information about the target computer. In process block 604, a translation module of the portable device translates any detected marking indicia for a computer ID of the target computer. Using the computer ID, the portable device establishes a connection with the target computer in process block 605. The portable device then uses a communication module, in process block 606, to transfer the binary copy of the document to the target computer. In process 607, a user may then view or otherwise manipulate the document on the target computer.

Figure 7:
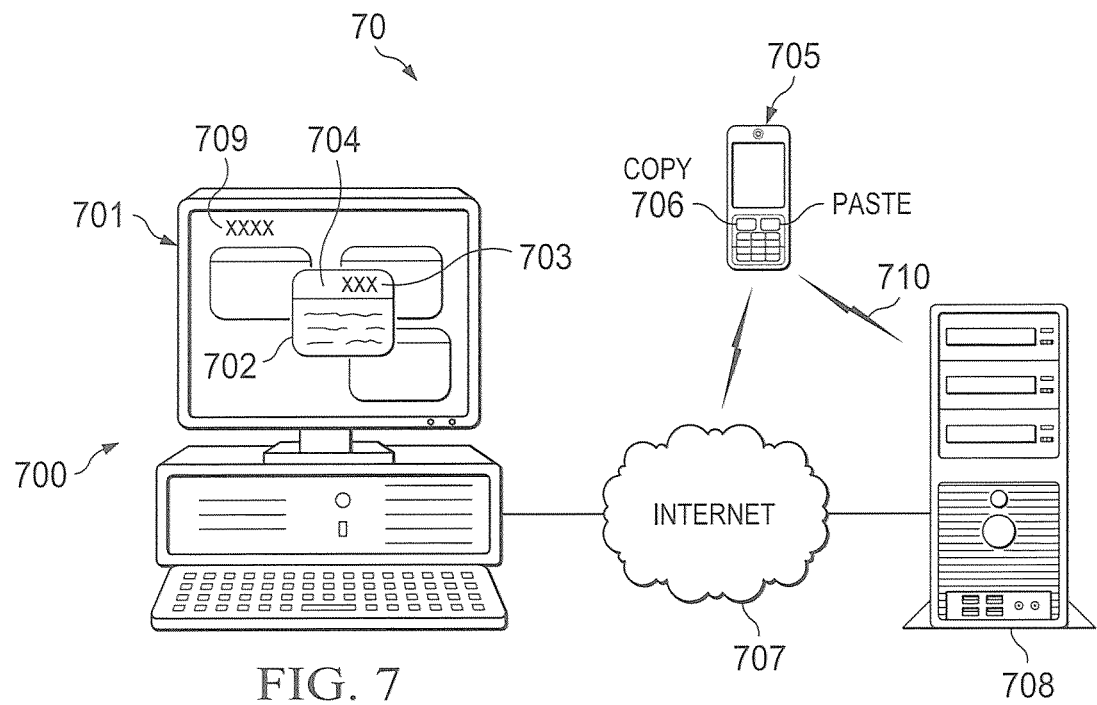
FIG. 7 is a diagram illustrating a document exchange system configured according to one embodiment of the present teaching.

In addition to the peer-to-peer communication system used to implement selected embodiments of the present teachings, additional and/or alternative embodiments of the present teachings may utilize a centralized server system for providing various document exchange systems. FIG. 7 is a diagram illustrating document exchange system 70 configured according to one embodiment of the present teaching. Computer system 700 displays document 702 which a user wishes to transfer to another computer. The first step in transferring document 702, according to methods described herein, is to obtain a binary copy of the document. Portable device 704 includes an application for document exchange which includes functionality to implement one embodiment of the teachings described herein. When selected for execution by the user, the document exchange application displays copy button 706 using a soft key and text rendered by the document exchange application. A soft key is a button on a portable device that may have any number of functionalities associated with it depending on the mode or operation of the portable device. By selecting copy button 706 while the user aims the camera lens of portable device 704 at computer display 701, the document exchange application takes control of the camera functionality of portable device 704 and captures an image of computer display 701.

The image data captured by portable device 705 includes an image of document 702. Portable device 705 analyzes the image data for any marking indicia that may be included in the image data. Document 702 includes marking indicia 703 displayed within title bar 704. However, computer display 701 also displays marking indicia 709. Portable device 705 translates marking indicia 703 and marking indicia 709 for location information associated with the document exchange application. On translation, portable device 705 determines that marking indicia 709 is not associated with the copy functionality of the document exchange application and disregards this information. Portable device 705 determines that marking indicia 703 is associated with the copy functionality and uses the location information identifying the location of computer system 700 and the location of the binary copy of document 702 on computer system 700 to signal document exchange server 708 via internet 707. Portable device 705 initiates a connection with internet 707 and transmits a copy request and the location information to document exchange server 708. When document exchange server 708 receives the request and the location information from portable device 705, it transmits a request to computer system 700 via internet 707 using the location information of computer system 700 and includes a request for document 702 at the address in computer system 700 indicated by the location information. Computer system 700 acknowledges the request, retrieves the binary copy of document 702 and transmits the binary copy to document exchange server 708. Document exchange server 708 then transmits the binary copy of document 702 to portable device 705 again via internet 707. Using this process, the binary copy of document 702 is copied by portable device 705.

It should be noted that in additional and/or alternative embodiments of the present teachings, document exchange server 708 comprises a wireless-enabled electronic device coupled locally to computer system 700. In such embodiments, computer system 700 may not have wireless capability to establish a peer-to-peer communication with portable device 705, as described in FIG. 3, or may be situated within a secure network, in which an administrator blocks all attempts to wirelessly access computer system 700 directly. By providing an authorized wireless connection with the wireless-enabled electronic device, visually represented in FIG. 7 by document exchange server 708, portable device 705 establishes a wireless connection, connection 710, with the wireless-enabled electronic device locally connected to computer system 700. This locally connected device acts as an intermediary between portable device 705 and computer system 700 by establishing a wireless communication link, connection 710, between itself and portable device 705. As such, any copy requests or paste requests will be passed through the locally connected wireless device.

Figure 8:
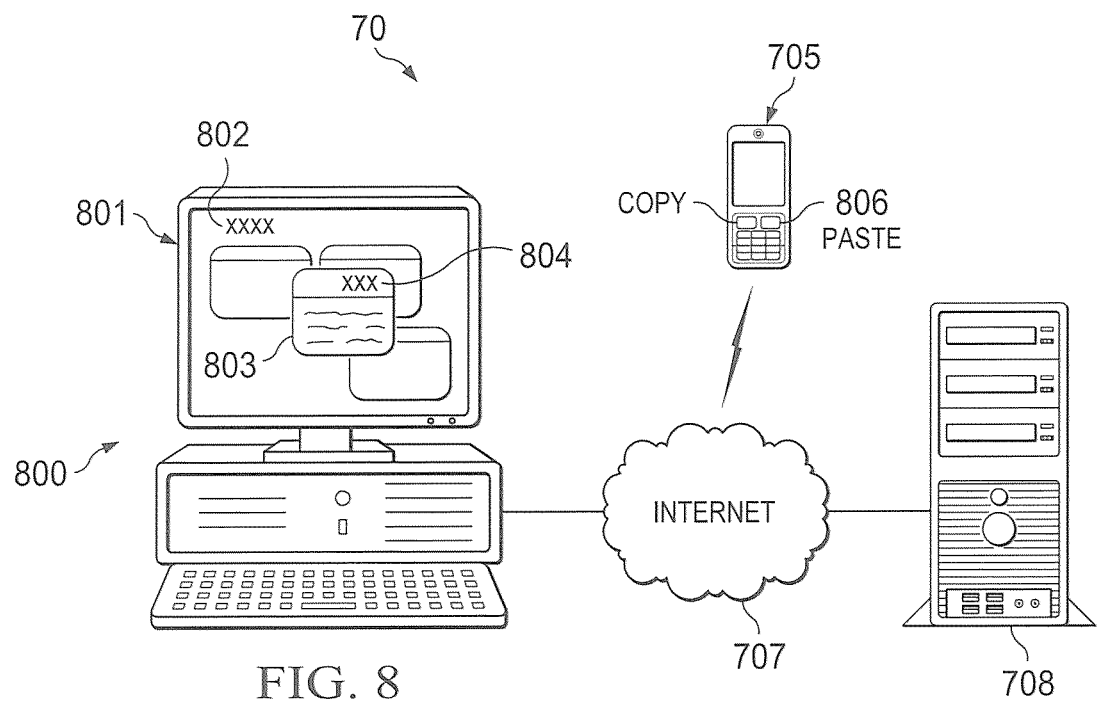
FIG. 8 is a diagram illustrating a document exchange system configured for paste functionality as described in one embodiment of the present teaching.

FIG. 8 is a diagram illustrating document exchange system 70 configured for paste functionality as described in one embodiment of the present teaching. After the copy process described with respect to FIG. 7, portable device 705 now includes a binary copy of document 702. The user desires to past document 702 to a different computer, such as computer system 800. The user carries portable device 705 to the vicinity of computer system 800 and initiates the document exchange application again on portable device 705. Just as the operation of the document exchange application provided copy button 706 (FIG. 7), it also provides paste button 806, using another soft key and text rendered by the document exchange application. The user then selects paste button 806 to initiate the paste process of the document exchange application. In response to selecting paste button 806, the document exchange application again takes control of the camera functionality of portable device 705 and captures an image of computer display 801. The image data captured of computer display 801 is again examined and analyzed for any marking indicia that may be present. Computer system 800 is displaying document 803 within computer display 801, which includes marking indicia 804. It also displays marking indicia 802. Portable device 705, thus, detects marking indicia 802 and 804 and translates these markings into location information. Portable device 705 determines that the location information connected with marking indicia 804 is not associated with the paste function, and, thus, portable device 705 discards this location information. Portable device 705 determines that marking indicia 802 represents the computer ID of computer system 800, which provides information on how to contact computer system 800.

Using the computer ID, portable device 705 again establishes a connection with document exchange server 708 via internet 707. Portable device 705 then transmits a paste request to document exchange server 708 which includes the computer ID of computer system 800 along with the binary copy of document 702. When document exchange server 708 receives this paste request package, it establishes a connection with computer system 800 using the computer ID, and then transmits the binary copy of document 702 to computer system 800. This completes the paste process of document 702 from portable device 705.

It should be noted that in additional and/or alternative embodiments of the present teachings, document exchange server 708 may retrieve the actual file for document 702 or may provide some processing on the binary copy in order to provide more flexibility for working with the copied or pasted "binary" version. In still further additional and/or alternative embodiments of the present teachings, document exchange server 708 may provide a pointer to document 702 to portable device 705. When portable device 705 is directed to do something with the copied version of document 702, it would use the pointer to retrieve either a copy of document 702 or a binary copy from one of document exchange server 708 or computer systems 700 or 800.

Embodiments, or portions thereof, may be embodied in program or code segments operable upon a processor-based system (e.g., computer system or computing platform) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 9:
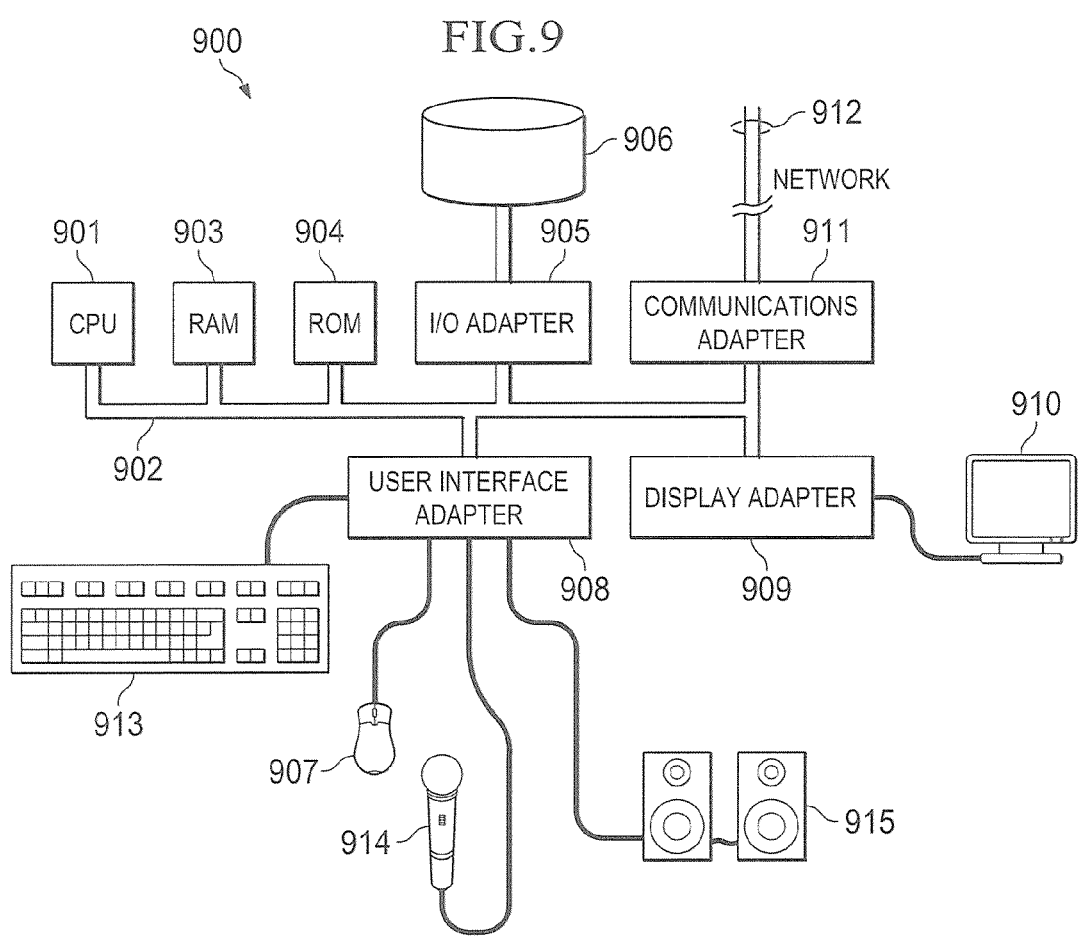
FIG. 9 illustrates an exemplary computer system which may be employed to implement the computers, portable devices, and document exchange servers and operations therein according to certain embodiments described herein.

FIG. 9 illustrates an exemplary computer system 900 which may be employed to implement the computers, portable devices, and document exchange servers and operations therein according to certain embodiments described herein. Central processing unit (CPU) 901 is coupled to system bus 902. CPU 901 may be any general-purpose CPU. The present disclosure is not restricted by the architecture of CPU 901 (or other components of exemplary system 900) as long as CPU 901 (and other components of system 900) supports the inventive operations as described herein. CPU 901 may execute the various logical instructions described herein. For example, CPU 901 may execute machine-level instructions according to the exemplary operational flow described above in conjunction with FIGS. 5 and 6. When executing instructions representative of the operational steps or blocks illustrated in FIGS. 5 and 6, CPU 901 becomes a special-purpose processor of a special purpose computing platform configured specifically to operate according to the various embodiments of the teachings described herein.

Computer system 900 also includes random access memory (RAM) 903, which may be SRAM, DRAM, SDRAM, or the like. Computer system 900 includes read-only memory (ROM) 904 which may be PROM, EPROM, EEPROM, or the like. RAM 903 and ROM 904 hold user and system data and programs, as is well known in the art.

Computer system 900 also includes input/output (I/O) adapter 905, communications adapter 911, user interface adapter 908, and display adapter 909. I/O adapter 905, user interface adapter 908, and/or communications adapter 911 may, in certain embodiments, enable a user to interact with computer system 900 in order to input information.

I/O adapter 905 connects to storage device(s) 906, such as one or more of hard drive, compact disc (CD) drive, floppy disk drive, tape drive, etc., to computer system 900. The storage devices are utilized in addition to RAM 903 for the memory requirements associated performing the document exchange operations. Communications adapter 911 is adapted to couple computer system 900 to network 912, which may enable information to be input to and/or output from system 900 via such network 912 (e.g., the internet or other wide-area network, a local-area network, a public or private switched telephony network, a wireless network, any combination of the foregoing). User interface adapter 908 couples user input devices, such as keyboard 913, pointing device 907, and microphone 914 and/or output devices, such as speaker(s) 915 to computer system 900. Display adapter 909 is driven by CPU 901 to control the display on display device 910 to, for example, display the various documents and marking indicia of the various described embodiments. Display adapter 909 transmits instructions for transforming or manipulating the state of the various numbers of pixels used by display device 910 to visually present the desired information to a user. Such instructions include instructions for changing state from on to off, setting a particular color, intensity, duration, or the like. Each such instruction makes up the rendering instructions that control how and what is displayed on display device 910.

It shall be appreciated that the present disclosure is not limited to the architecture of system 900. For example, any suitable processor-based device may be utilized for implementing the document exchange system, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

In the foregoing detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description have been presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing" "calculating," "determining" or the like, refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Although the present teachings and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present teachings, processes, machines, manufacture, compositions of matter, means, methods, or steps, presently existing or later to be developed that perform substantially the same function or achieve substantially the same result as the corresponding embodiments described herein may be utilized according to the present teachings. Accordingly, the appended claims are intended to include within their scope such processes, machines, manufacture, compositions of matter, means, methods, or steps.

What is claimed is:

1. A computer implemented method comprising:
    capturing a first image on a portable device of a first computer display, wherein a document is shown on said first computer display;
    identifying, on said first image, marking indicia representing location information associated with the document and a first computer coupled to the first computer display;
    responsive to identifying said marking indicia, translating said marking indicia into the location information associated with the document and the first computer coupled to the first computer display;
    transmitting a request to the first computer using said location information, said request requesting a copy of said document from said first computer;
    receiving said copy at said portable device from said first computer; and
    rendering said copy onto a portable display of said portable device.

2. The computer implemented method of claim 1 wherein said copy of said document comprises a binary copy of said document.

3. The computer implemented method of claim 1 wherein said copy of said document comprises a pointer to said document.

4. The computer implemented method of claim 1 wherein said marking indicia are located on a title bar of a window containing said document.

5. The computer implemented method of claim 4 wherein said marking indicia are displayed on said title bar only when said window has focus of said first computer.

6. The computer implemented method of claim 1 wherein said transmitting said request to said first computer comprises:
  transmitting said request to said first computer via a document exchange server, wherein said copy received at said portable device from said first computer is received via said document exchange server.

7. The computer implemented method of claim 6 further comprising:
  processing said copy at said document exchange server prior to one or more of:
    forwarding said transmitted request from said document exchange server to said first computer; and
    forwarding said copy from said document exchange server to said portable device.

8. The computer implemented method of claim 1 wherein said copy of said document comprises one of:
  a formatted copy of said document;
  a binary copy of said document; or
  a pointer to said document.

9. A computer program product having a non-transitory computer readable medium with computer program logic recorded thereon, said computer program product comprising:
  code for obtaining a copy of a document at a portable device, the portable device obtaining the copy from a first computer device by capturing a first image of a document displayed on a first computer display of the first computer device, identifying the document using marking indicia on the first image, and requesting and receiving the copy of the document; and
  code for providing the copy of the document from the portable device to a second computer device, the portable device providing the copy by capturing a second image of a second computer display of the second computer device, identifying the second computer using additional marking indicia on the second image, and sending the copy from the portable device to said second computer.

10. The computer program product of claim 9 wherein providing the copy occurs in response to receiving a paste input command on the portable device.

11. A mobile device comprising:
  a processor coupled to storage memory;
  a lens under control of a camera application stored in said storage memory, wherein, when executed by said processor, said operating camera application configured to capture image data through said lens;
  a transceiver under control of said processor and configured to transmit and receive data;
  a document exchange application stored in said storage memory, wherein, when executed by said processor, said operating document exchange application performing operations comprising:
    examining a first image captured through said lens of a first computer screen displaying a document to be exchanged, wherein said first image is examined for marking indicia associated with said document, the marking indicia representing location information associated with the document and a first computer coupled to the first computer screen;
    translating said marking indicia, responsive to said marking indicia being detected, into the location information associated with the document and the first computer coupled to the first computer screen; and
    transmitting a request to said first computer through said transceiver and using said location information, wherein said request requests a copy of said document.

12. The mobile device of claim 11 wherein said operations further comprise examining a second image of a second computer screen coupled to a second computer, wherein said second image is examined for additional marking indicia associated with said second computer.

13. The mobile device of claim 12 wherein said operations further comprise translating said additional marking indicia, responsive to said additional marking indicia being detected, into additional location information identifying said second computer.

14. The mobile device of claim 13 wherein said operations further comprise transmitting said copy to said second computer through said transceiver and using said additional location information.

15. The mobile device of claim 11 wherein said operations further comprise transmitting said request to said first computer through said transceiver via a document exchange server, wherein said document exchange server forwards said request to said first computer.

16. The mobile device of claim 15 wherein said operations further comprise receiving said copy from said first computer via said document exchange server, wherein said document exchange server receives said copy from said first computer.

17. A specially programmed computer comprising:
  a processor coupled to storage memory;
  a network interface under control of said processor and configured to send and receive data from one or more networks;
  a computer identifier (ID) stored in said storage memory representing an identity and location of said specially programmed computer;
  a document exchange application stored in said storage memory, wherein, when executed by said processor, said document exchange application performing operations comprising:
    receiving a request from a mobile device through said network interface and use location information contained within said request to retrieve a copy of a document associated with said location information,
  sending said copy to said mobile device,
  wherein said location information was translated by a requesting device from marking indicia identified in an image of said document shown on a computer display, the marking indicia representing the location information associated with the document and a first computer coupled to the computer display from which the copy of the document is retrieved.

18. The specially programmed computer of claim 17 wherein said operations further comprise receiving said request from said mobile device through a document exchange server, wherein said document exchange server receives said request from said mobile device.

19. The specially programmed computer of claim 18 wherein said operations further comprise sending said copy to said mobile device through said document exchange server.

20. The specially programmed computer of claim 17 wherein said operations further comprise:
  receiving said request from said mobile device through a wireless-enabled electronic device coupled locally to said specially programmed computer, wherein said wireless-enabled electronic device establishes a wireless communication link with said mobile device; and sending said copy to said mobile device through said wireless-enabled electronic device.

21. A computer program product having a non-transitory computer readable medium with computer program logic recorded thereon, said computer program product comprising:
    code for capturing a first image on a portable device of a first computer display, wherein a document is shown on said first computer display;
    code for examining said first image for marking indicia representing location information associated with the document and a first computer coupled to the first computer display;
    code for responsive to identifying said marking indicia, translating said marking indicia into the location information associated with the document and the first computer coupled to the first computer display;
    code for transmitting a request to a first computer coupled to said first computer display using said location information, said request requesting a copy of said document from said first computer;
    code for receiving said copy at said portable device from said first computer; and
    code for transforming a state of ones of a plurality of pixels of a portable display of said portable device to render said copy onto said portable display.

22. The computer program product of claim 21 wherein said code for transmitting said request to said first computer comprises:
    code for transmitting said request to said first computer via a document exchange server, wherein said copy received at said portable device from said first computer is received via said document exchange server.

23. The computer program product of claim 22 further comprising:
    code for processing said copy at said document exchange server prior to executing one or more of:
        forwarding said transmitted request from said document exchange server to said first computer; and
        forwarding said copy from said document exchange server to said portable device.

24. The computer program product of claim 21 wherein said copy of said document comprises one of:
    a formatted copy of said document;
    a binary copy of said document; or
    a pointer to said document.

25. The computer program product of claim 21 wherein said marking indicia are located on a title bar of a window containing said document.

26. The computer program product of claim 25 wherein said marking indicia are displayed on said title bar only when said window has focus of said first computer.

27. A computer implemented method comprising:
    obtaining a copy of a document at a portable device, the portable device obtaining the copy from a first computer device by capturing a first image of a document displayed on a first computer display of the first computer device, identifying the document using marking indicia on the first image, and requesting and receiving the copy of the document; and
    providing the copy of the document from the portable device to a second computer device, the portable device providing the copy by capturing a second image of a second computer display of the second computer device, identifying the second computer using additional marking indicia on the second image, and sending the copy from the portable device to said second computer.

28. The computer implemented method of claim 27 wherein providing the copy occurs in response to receiving a paste input command on the portable device.

29. The computer implemented method of claim 27 wherein the additional marking indicia are located on a desktop of the second computer device.

30. The computer implemented method of claim 27 wherein the additional marking indicia are located on a title bar of a window of the second computer device.

31. The computer implemented method of claim 30 wherein said additional marking indicia are displayed on said title bar only when said window has a focus of said second computer.

\* \* \* \* \*